Feb. 19, 1957 B. J. McGOVERN ET AL 2,781,798
MILK PUMPING APPARATUS
Filed April 10, 1953 2 Sheets-Sheet 1
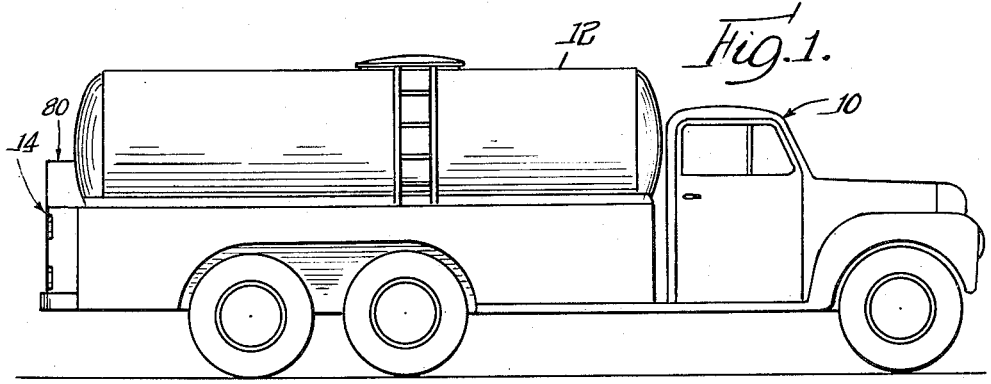
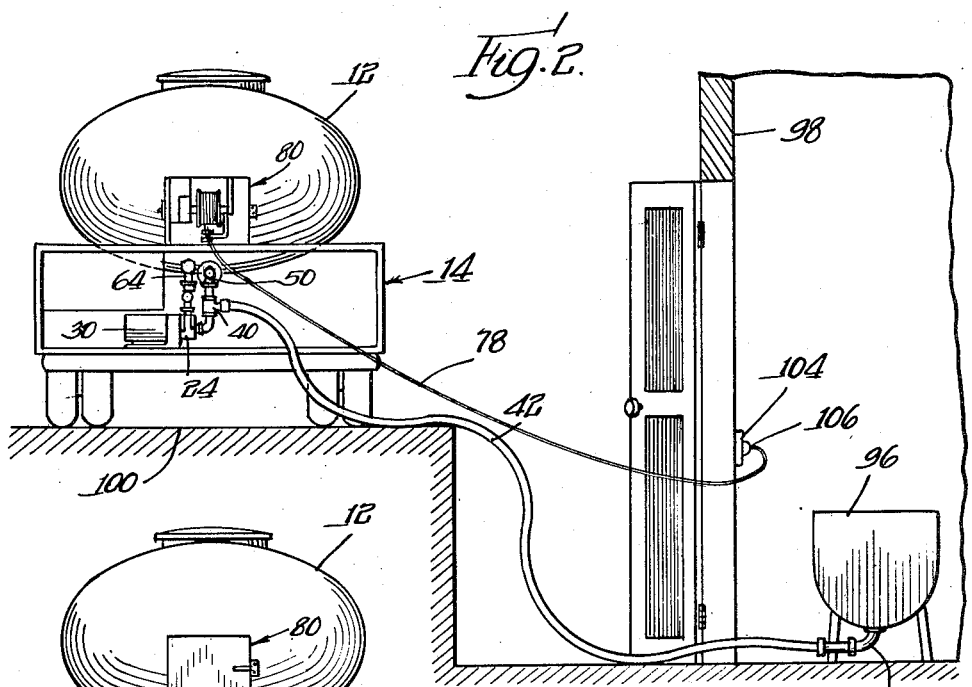
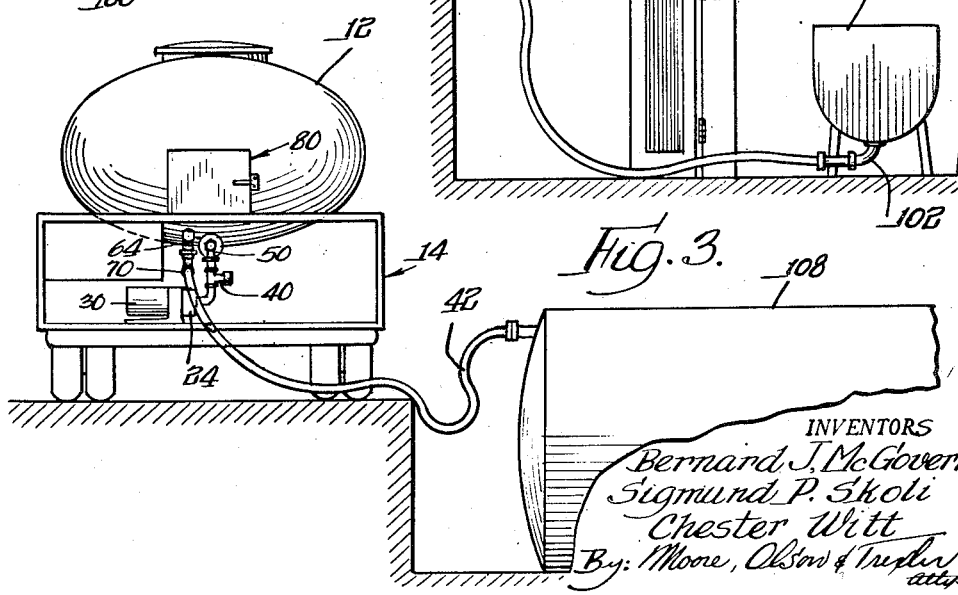
INVENTORS
Bernard J. McGovern
Sigmund P. Skoli
Chester Witt
By: Moore, Olson & Trexler
attys Feb. 19, 1957  B. J. McGOVERN ET AL  2,781,798
MILK PUMPING APPARATUS Filed April 10, 1953  2 Sheets-Sheet 2

INVENTORS.
Bernard J. McGovern
Sigmund P. Skoli
Chester Witt
By: Moore, Olson & Trexler
attys United States Patent Office 2,781,798
Patented Feb. 19, 1957

2,781,798

MILK PUMPING APPARATUS

Bernard J. McGovern, Chicago, Sigmund P. Skoli, Elmwood Park, and Chester Witt, Deerfield, Ill., assignors to Mojonnier Bros. Co., Chicago, Ill., a corporation of Illinois Application April 10, 1953, Serial No. 347,922

3 Claims. (Cl. 141—25)

The present invention relates to a novel apparatus for transferring fluids from one storage tank to another, and more particularly to a novel pumping apparatus for effecting the transfer of fluid milk between a tank truck and a storage container.

It has become quite common in certain industries to transfer fluids from one location to another by means of a truck having a large storage tank mounted on the body thereof. This practice is becoming increasingly popular in the milking industry, in connection with the transfer of milk from the dairy farms to the milk processing plants. In many instances, milk is stored at the farm in large tanks from which the milk must be pumped to the tank truck. In order to transfer the milk from the storage tank to the tank truck, it is generally desirable to mount a pump permanently on the truck. In general, such a pump may be either a positive displacement pump or a centrifugal pump. It has been found that a centrifugal pump is preferable for such an installation since it is generally less expensive, requires less horsepower to do the work, is easier to clean, requires less maintenance, and is substantially lighter in weight than a positive pump that will do the same amount of work in the same time. However, centrifugal pump installations have certain disadvantages, one being that a centrifugal pump is not sufficiently self-priming to draw fluids from a substantial distance below the pump, and another is that a centrifugal pump sharply loses its efficiency, or even stops pumping, on becoming airbound. Because of these disadvantages heretofore, centrifugal pumps have not been satisfactory on milk trucks, because there are many instances where the milk storage tank on the farm is located in a basement or otherwise well below ground level so that a centrifugal pump could not create a sufficient suction head intially to draw the milk from the storage tank, and, in addition, such pumps would become airbound when the level of the milk in the storage tank was reduced to a point where air could enter the hose or other conduit connecting the storage tank with the pump.

It is an important object of this invention to provide a novel centrifugal pump installation primarily for use with tank trucks, by which installation the above mentioned disadvantages of centrifugal pumps are overcome.

Another object of this invention is to provide a novel centrifugal pump installation, which installation includes means for priming the centrifugal pump and for preventing the centrifugal pump from becoming airbound.

Another object of the present invention is to provide a novel pump installation of the above described type, which pump installation may be used not only to transfer fluid from a storage tank into the tank truck, but also to transfer fluid from the tank truck to any desired point of discharge.

A still further and important object of the invention, is to provide a pump installation of the foregoing type, particularly adapted for maintained sanitation, and for the handling of fluid milk.

Other objects and advantages of the present invention will become apparent from the following description and the accompanying drawings, wherein:

Fig. 1 is a side elevational view of a tank truck for which the principles of this invention are especially useful;

Fig. 2 is a rear elevational view, showing the novel fluid pumping installation of this invention mounted on a tank truck and connected with a storage tank located below ground level in a manner to transfer the fluid from the storage tank to the tank truck;

Fig. 3 is a view similar to Fig. 2, but showing the novel pumping installation connected with another storage tank in a manner to transfer the fluid from the tank truck to the storage tank;

Figure 4:
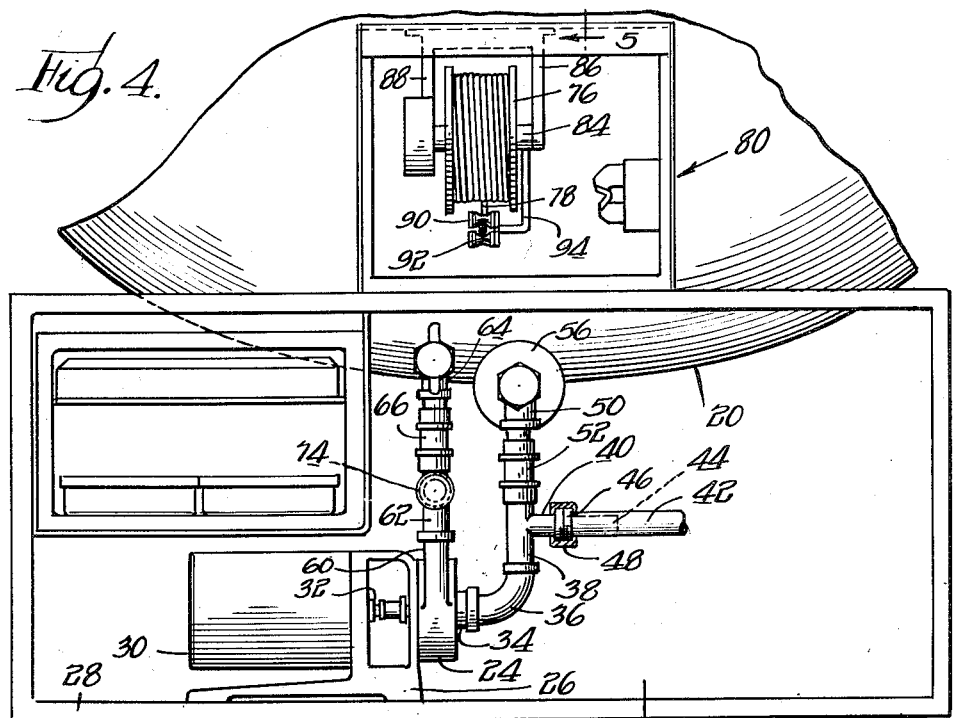
Fig. 4 is an enlarged fragmentary end view similar to Fig. 2 and showing the novel features of this invention in greater detail.

Referring now more specifically to the drawings, wherein like parts are designated by the same numerals throughout the various figures, a tank truck 10, embodying the principles of this invention, is shown best in Fig. 1. The truck 10 may be of any standard design and includes a large tank 12. In cases where the present invention is to be applied to milk trucks, the walls of the tank 12 may be insulated, and means may be provided for cooling tank 12 in the usual manner. A compartment 14 for housing the pumping installation of this invention is located at any desired point on the truck and preferably at the end thereof, as illustrated. As shown best in Fig. 5, one vertical wall 16 of the compartment 14 and the top wall 18 of the compartment are positioned so that a corner portion 20 extends into the compartment, whereby the compartment is cooled by the tank. The walls and the door 22 of the compartment are insulated so that the interior of the compartment is maintained in a cooled condition.

Figure 5:
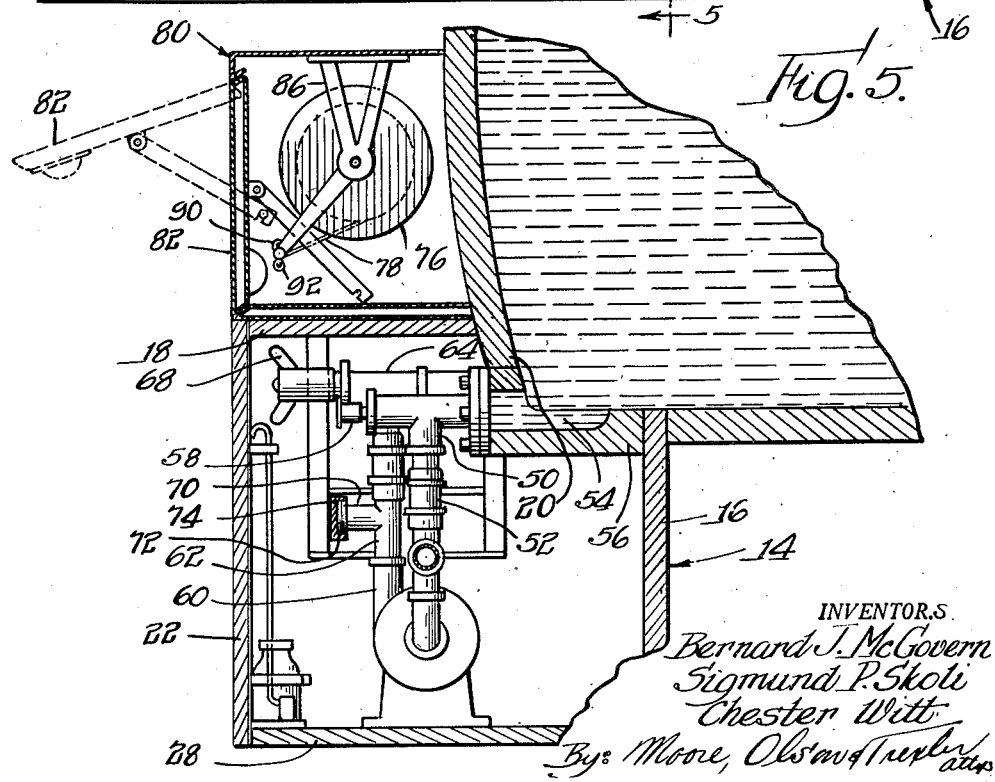
Fig. 5 is a vertical cross section taken along line 5—5 in Fig. 4.

As shown best in Figs. 4 and 5, the novel pumping installation of this invention includes a centrifugal pump 24 mounted on a frame 26, which frame may be secured to the bottom 28 of the compartment in any suitable manner. An electric motor 30 is also mounted on the frame 26 and is operatively connected with the centrifugal pump in a conventional manner by a shaft 32. The inlet 34 of the centrifugal pump is connected to an elbow pipe section 36, which in turn is connected to a T-pipe section 38. The shank 40 of the T-section terminates in a flanged end adapted to be connected to the end of a flexible hose 42 by any suitable connection means, such as a pipe section 44 inserted in and secured to the hose, which pipe section has a flanged end 46 adapted to be drawn against the flange of the shank 40 by a nut 48. The remaining end of the T-section is connected to valve 50 by any suitable means, such as the coupling 52. The valve 50 communicates with the interior of the tank 12 through a passageway 54 formed in a mounting block 56 welded or otherwise secured to the tank. An actuating handle 58 is provided for opening and closing the valve for a purpose to be fully described below. It should be understood that the valve 50 may be of any suitable type which will enable the flow of liquid through the valve to be adjusted to any desired amount, and of maintained sanitation.

The outlet 60 of the pump is connected with the truck tank through a T-pipe section 62, a valve 64, and any suitable coupling 66. The valve 64 is opened and closed by means of an actuating handle 68. The T-pipe section 62 includes a shank 70 having an enlarged flanged end 72 for connection with a hose or conduit similar to the hose 44 for a purpose to be described below. However, when the pumping system is connected for pumping fluid from a storage tank into the tank of the truck, the open end of the shank 70 is closed by any suitable cap 74.

In general, it is desirable to operate the electric pump motor 30 from a source of electric energy other than the usual truck battery. Therefore, a reel 76 is provided for mounting a long electric cord 78, which includes the usual plug for connection with an electric outlet. In practice, the electric outlet will generally be provided on the building housing the storage tank from which the fluid is transferred to the truck tank. The electric cord 78 is operatively connected with the motor 30 in any suitable manner, not shown.

The reel 76 is mounted within a compartment 80, which compartment may conveniently be located on top of the pump compartment 14. The reel compartment 80 is provided with a door 82 which may be opened to permit the electric cord to be withdrawn. Compartment 80 need not be refrigerated.

The reel 76 is rotatably mounted on an axle 84, which axle in turn is supported by brackets 86 and 88 secured to the top of the compartment 80. The electric cord is guided from the reel by means of a pair of rollers 90 and 92 suitably mounted on the end of an arm 94 secured to the bracket 86.

The operation of the novel fluid transferring installation of this invention is as follows. The tank trunk is, of course, first driven to the desired location near the storage tank from which the fluid is to be transferred. Fig. 2 illustrates the use of this invention for transferring milk from a storage tank 96 in a milk house 98. It should be noted that as often occurs in actual practice, the storage tank 96 is located well below the level of the ground 100 on which the tank trunk rests. After the trunk is in position, the hose 42 is uncoiled from its storage location in the compartment 14, and one end of the hose is connected to the outlet 102 of the storage tank 96. The opposite end of the hose 42 has generally been previously connected with the inlet side of the centrifugal pump through the T-pipe section 38 in the manner shown in Fig. 4. The electric cord 78 is then connected with an electric outlet 104 on the milk house wall by means of the usual plug 106.

The installation is now ready to begin transferring milk from the storage tank 96, through hose 42, and through pipe section 36, pump 24, pipe section 66, and valve 64 to the truck 12. However, it has been found that centrifugal pumps cannot produce a sufficient suction head initially to draw the milk from a tank located well below the pump, as shown in Fig. 2. Therefore, in accordance with this invention, the valve 50 is partially opened to permit a slight flow of milk from the truck tank 12 through the T-pipe 38 and to the inlet side of the pump. It has been found that this slight flow of liquid primes the pump sufficiently to enable the pump to draw the milk from a tank positioned in the manner shown in Fig. 2.

After the milk starts flowing from the storage tank 96 to the tank truck 12, the valve 50 may be closed if desired. However, if this is done, when the level of the milk in the storage tank 96 is reduced to the point where air bubbles enter the hose 42 and the centrifugal pump, the efficiency of the pump is greatly reduced, and in most instances, the pumping action is stopped altogether so that the storage tank cannot be completely drained. The present invention also overcomes this disadvantage since it has been found that by again opening the valve 50 so as to permit a small amount of liquid to recirculate from the truck tank 12 through the pump, the recirculating liquid prevents the centrifugal pump from becoming airbound so that the pump completely drains the storage tank 96.

Another advantage of the novel pumping installation of this invention is that the same pump may be used not only to transfer liquid from a storage tank into the tank truck, but also to transfer liquid from the tank truck to another storage tank, such as a tank 108, at a milk processing plant. This operation is illustrated in Fig. 3, wherein it is seen that the hose 42 has been connected to the outlet side of the pump through the shank 70 of the T-pipe section 62. It is understood, of course, that before the hose is connected to the shank 70, the cap 74 is removed therefrom and used to close the end of the shank 40 of the T-pipe section 38. After the hose 42 has been connected to the shank 70, the valve 50 is fully opened to permit the maximum flow of liquid therethrough. It is understood, of course, that the valve 64 has been previously fully closed.

From the above description, it is seen that the present invention provides a novel liquid transferring apparatus which is fully capable of carrying out the objects set forth hereinabove. More specifically, because of the novel arrangement of conduits and valves connecting the centrifugal pump with the tank trunk, the centrifugal pump may be primed initially to start the pumping action and also to insure complete draining of a storage tank. In addition, it is seen that in the arrangement provided the same means or valve 50 which is used for priming the pump when fluid is being transferred into the trunk tank is also used for connecting the pump with the tank when liquid is being transferred out of the truck tank.

Furthermore it is to be noted that the installation is by its arrangement particularly adapted for the handling of sterile fluids, such as milk, in that it is adapted for maintained sanitation, under refrigerated conditions; and is by its arrangement enabled to handle fluid milk without contamination or excessive turbulence or other factors of damage to the milk bodies.

While the preferred embodiment of the present invention has been shown and described herein, it is obvious that many structural details may be changed without departing from the spirit and scope of the appended claims.

We claim:

1. An apparatus for transferring liquid, comprising a mobile base, a tank mounted on said base, a compartment mounted on said base and including a portion of said tank for heat exchange purposes, a centrifugal pump having an inlet and an outlet and mounted in said compartment, conduit means including an adjustable valve connecting said tank and said inlet of the pump, a second conduit means including a valve connecting said tank and the outlet of the pump and said first mentioned conduit means including means adapted to be connected with a source of liquid for transferring liquid from said source to said tank.

2. An apparatus for transferring liquids, comprising a mobile base, a tank mounted on said base, a compartment mounted on said base and including a portion of said tank for heat exchange purposes, a centrifugal pump having an inlet and an outlet and mounted in said compartment, means connecting the outlet of said pump with said tank, means separately connecting the inlet of said pump and said tank in position for priming said pump, and means for connecting the inlet of said pump with a source of liquid to be transferred.

3. An apparatus for transferring liquid, comprising a mobile base, tank means for confining a body of liquid, a compartment mounted on said base and including a portion of said tank means for heat exchange purposes, a centrifugal pump mounted in said compartment and having an inlet and an outlet, means connecting the outlet of said centrifugal pump with said liquid confining means, means separately connecting the inlet of said centrifugal pump and said liquid confining means in position for priming said centrifugal pump, and means for connecting the inlet of said centrifugal pump with a source of liquid to be transferred to said liquid retaining means.

References Cited in the file of this patent

UNITED STATES PATENTS

| | | |
|---|---|---|
| 839,046 | Bole | Sept. 4, 1906 |
| 2,461,925 | Rupp | Feb. 15, 1949 |
| 2,634,110 | Rupp | Apr. 7, 1953 |